No. 817,775. PATENTED APR. 17, 1906.
J. B. HIPWELL.
KNITTING MACHINE.
APPLICATION FILED APR. 29, 1905.

No. 817,775. PATENTED APR. 17, 1906.
J. B. HIPWELL.
KNITTING MACHINE.
APPLICATION FILED APR. 29, 1905.

Witnesses
Caleb J. Bieber
D. M. Stewart

John B. Hipwell
Inventor by J. Stewart
Attorney

UNITED STATES PATENT OFFICE.

JOHN B. HIPWELL, OF READING, PENNSYLVANIA, ASSIGNOR TO WINDSOR MACHINE CO., OF READING, PENNSYLVANIA, A CORPORATION.

KNITTING-MACHINE.

No. 817,775.　　　Specification of Letters Patent.　　　Patented April 17, 1906.

Application filed April 29, 1905. Serial No. 257,995.

*To all whom it may concern:*

Be it known that I, JOHN B. HIPWELL, a citizen of the United States, residing in the city of Reading, county of Berks, State of Pennsylvania, have invented certain new and useful Improvements in Knitting-Machines, of which the following is a specification.

My invention relates particularly to automatic circular-knitting machines adapted for knitting stockings; and it consists in certain improvements in the various mechanisms comprised in machines of this class and in their relative arrangement and coöperation, whereby the various results desired may be satisfactorily secured with simplicity and economy both of construction and operation.

To this end the invention consists in the improvements hereinafter fully described and particularly pointed out in the claims.

In the accompanying drawings, which illustrate a preferred embodiment of my improvements, Figs. 9 to 18 illustrate the splicer mechanism and take-up, Fig. 9 showing a general view of the main parts in the positions assumed for ordinary circular knitting with dotted lines indicating the parts raised to proper position to connect the two threads, Fig. 10 showing the operating means therefor at the base of the supporting-post, the view being at right angles to Fig. 9. Figs. 11 to 14 are enlarged views showing the thread-cutting means provided at one end of the thread-splicing trough. Figs. 15 to 17 are similar views of the clamping means at the other end of said trough, and Fig. 18 is a sectional elevation on the line 18 18 of Fig. 9 with the thread-splicing trough in raised position.

The various operations incident to the continuous production of stockings on circular-knitting machines are well known, and different mechanisms and combinations of mechanisms have been devised for effecting the same and for automatically changing the operations, as required, at different stages of the process. The novel mechanisms provided in my improved machine will be fully described in connection with a description of the successive movements and operations effected thereby.

Figure 4:
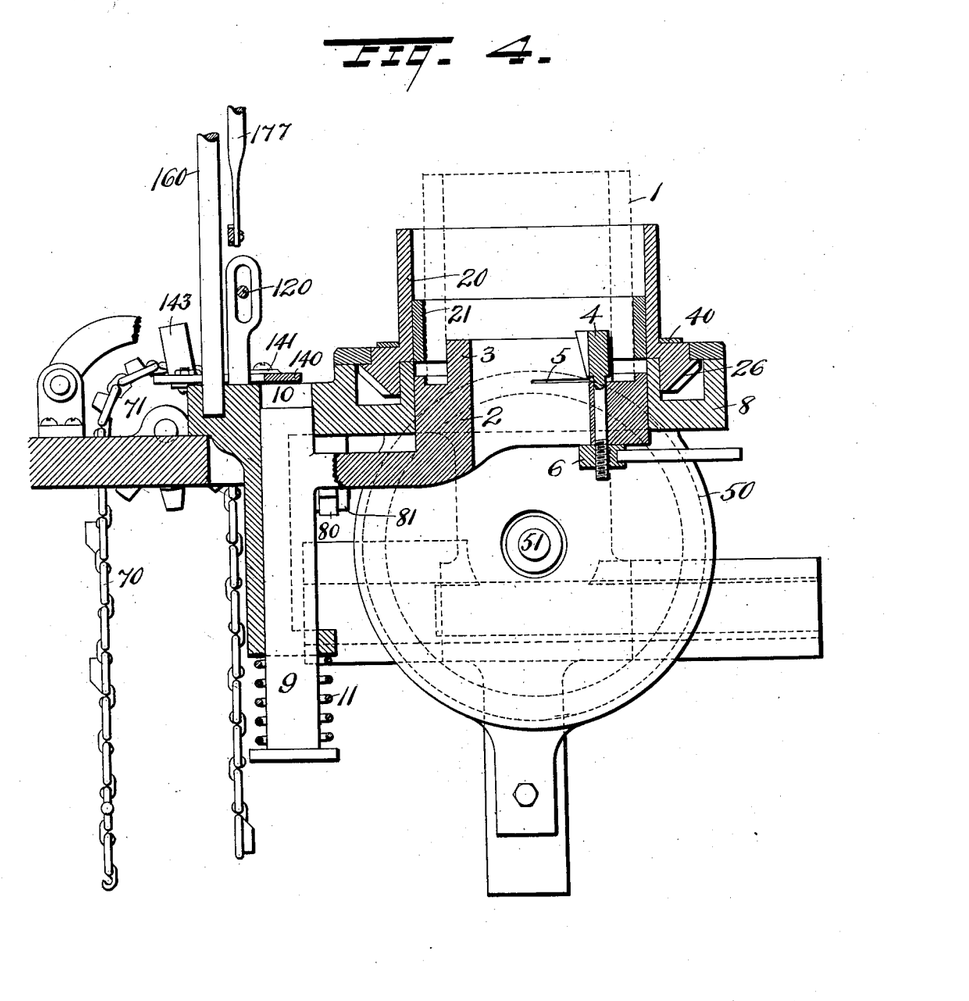
Fig. 4 is a cross-sectional elevation on the line 4 4 of Fig. 1 looking in the direction of the arrow.

The needle-cylinder 1, provided with vertically-guided needles having hubs of different lengths, as usual, is carried by the vertically-adjustable ring 2, Fig. 4, to which it is removably clamped by means of the expansible annular top 3 of said ring, over which the needle-cylinder is loosely fitted and to which it is tightly secured by subsequently expanding said annular top, which is split by cutting away a portion thereof to receive a wedge-block 4 and partially separated from the main ring 2 by a horizontal cut 5 to permit of easy expansion when the wedge-block 4 is drawn down by means of a clamping-nut 6. The needle-cylinder, as shown, is arranged so as to be vertically movable in the frame 8 of the machine, its supporting-ring 2 being provided with a plunger-guide 9 movable in a vertical guideway 10 in the frame and being raised by means hereinafter described against a depressing-spring 11 to vary the length of the loops as desired in fashioning the leg and in knitting the heel and toe.

Figure 5:
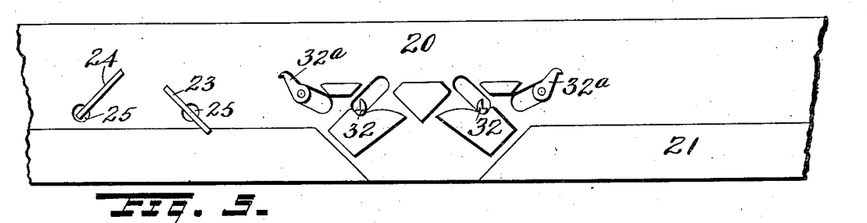
Fig. 5 is a diagrammatic view of the interior of the cam-cylinder developed upon a plane.
Figure 6:
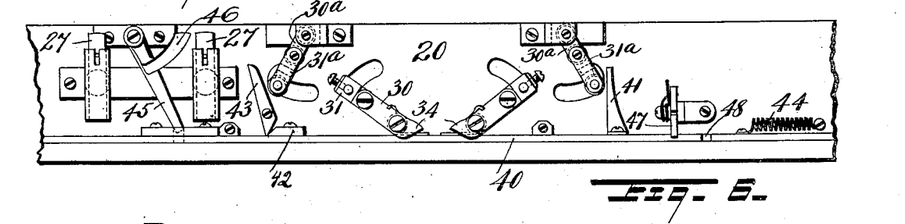
Fig. 6 is an exterior view of the cam-cylinder developed upon a plane, showing also the ring sliding thereon and its relation to the other movably-mounted parts.
Figure 7:
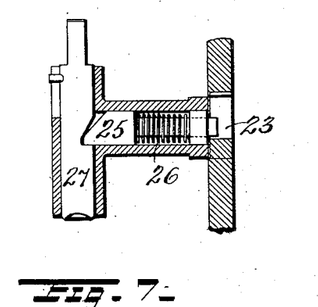
Figs. 7 and 8 show, in enlarged detail, the plunger-operated throw-in or throw-out cams in different positions.
Figure 8:
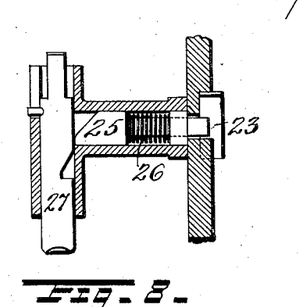

The rotary cam-cylinder 20 21, inclosing the fixed needle-cylinder, is provided, as usual, with fixed cams, pickers for respectively lowering and raising the hubbed needles into or out of action during the usual widening and narrowing operations, and throw-out and throw-in cams for raising or lowering half the needles at once. Referring particularly to Figs. 5 and 6, it will be seen that the throw-out cam 23 and the throw-in cam 24 are each carried by a plunger-shank 25, guided in a radially-arranged fitting 25ª on the cam-cylinder. These cams are each normally pressed outward by a spring 26, but at proper times are forced inward, so as to engage the needle-hubs by means of vertically-movable wedge-plungers 27, adapted to engage the ends of the shanks 25 of the cams, said wedge-plungers being operated by means hereinafter described. The lifter-pickers, as shown, are similar to those described in Patent No. 749,933, issued to me January 19, 1904, comprising a spring-pressed main arm 30, pivoted to the cam-cylinder, an independently-spring-pressed secondary arm 31, pivoted to the free end of the main arm, a needle-engaging finger 32, mounted upon the free end of the secondary arm and extending through an opening 33 in the cylinder into the path of the needle-hubs, and a stop 34 to limit the motion of the main arm. The drop-pickers are of similar construction to the lifters, each comprising a spring-pressed main arm 30$^a$, an independently-spring-pressed secondary arm 31$^a$, and a needle-engaging finger 32$^a$, the latter, however, being pivotally mounted at the free end of the secondary arm and independently spring-pressed, so as to provide a third pivotal movement to facilitate the clearance of the needle-hubs. The dropper construction shown also differs in detail from that of the lifter, but is otherwise essentially similar.

In connection with the cam-cylinder I employ a picker-controlling slide-ring 40 thereon. As shown, this is provided with a fixed finger 41, arranged to directly contact with and swing into inoperative position one of the drop-pickers, and with a projection 42, arranged to contact with one end of a separate finger 43, which is pivotally secured to the cam-cylinder adjacent to the other drop-picker, so as to similarly swing the latter. The required movement is given to the slide-ring 40 against the returning action of a spring 44 by an engaging lever 45, pivotally secured to the cam-cylinder between the two wedge-plungers 27, said lever being provided with an arm 46, which is operated by the same means that operates the wedge-plungers 27, as hereinafter described. When the slide-ring 40 has been moved by the lever 45, it is automatically locked by a spring-latch 47 on the cam-cylinder, engaging a notch 48 in the ring, and so held until released, as hereinafter described.

Having thus described the knitting-head and directly-connected parts involved in my invention, I will now describe the different mechanisms and their coöperative arrangement provided in my improved machine, as shown, for automatically effecting at proper times the different movements and changes in the knitting operation required to produce a stocking.

The cam-cylinder 20 is rotated, as usual, by means of a bevel-wheel 50, arranged in mesh with the toothed rim 26 thereof. This bevel-wheel 50 is fixed to a drive-shaft 51, provided with a loose pulley 52 and a drive-pulley 53. Upon the intermediate portion of the shaft 51 is a feathered clutch 54, located between a spring-pressed loose pinion 55 adjacent the bevel-wheel 50 and a pinion 56, fixed to the extended hub of the drive-pulley, so that when said clutch is moved into engagement with the drive-pulley pinion 56 the bevel-wheel 50 will be continuously rotated with the drive-pulley. The pinion 56 constantly meshes with and rotates a crank-wheel 57, which through a connecting-rod 58 gives reciprocating movement to a rack-bar 63, slidably mounted in a suitably-slotted guide-cylinder 59 and adapted to engage the loose pinion 55 on the drive-shaft 51, so that when the clutch 54 is thrown into engagement with said pinion 55 a reciprocating movement is imparted by said rack-bar to the cam-cylinder as required during the narrowing and widening operations. In connection with the loose and driving pulleys a spring-pressed belt-shifter 60 is provided, the guide-bar 61 of which is notched to receive a spring-lifted latch 62, the depressing of which releases the belt-shifter to stop the machine.

The pattern-chain 70 is carried upon a chain-wheel 71, which is moved intermittently by means of a pawl 72, engaging the ratcheted portion 73 thereof. This pawl 72 is pivoted at 74 to a pawl-carrying lever 75, arranged to be swung upon a pin 76 in frame-post 77 by each forward movement of the rack-bar 63, the latter having a side projection 64 arranged to contact with the free end of the pawl-carrying lever 75, so as to turn the pattern-wheel one notch at each forward movement, a spring 78 serving to return the pawl and its carrying-lever to their normal positions. The pattern-chain carries a series of suitably formed and placed projections, by means of which the required movements of the different mechanisms hereinafter described are primarily effected in proper sequence and time.

Figure 3:
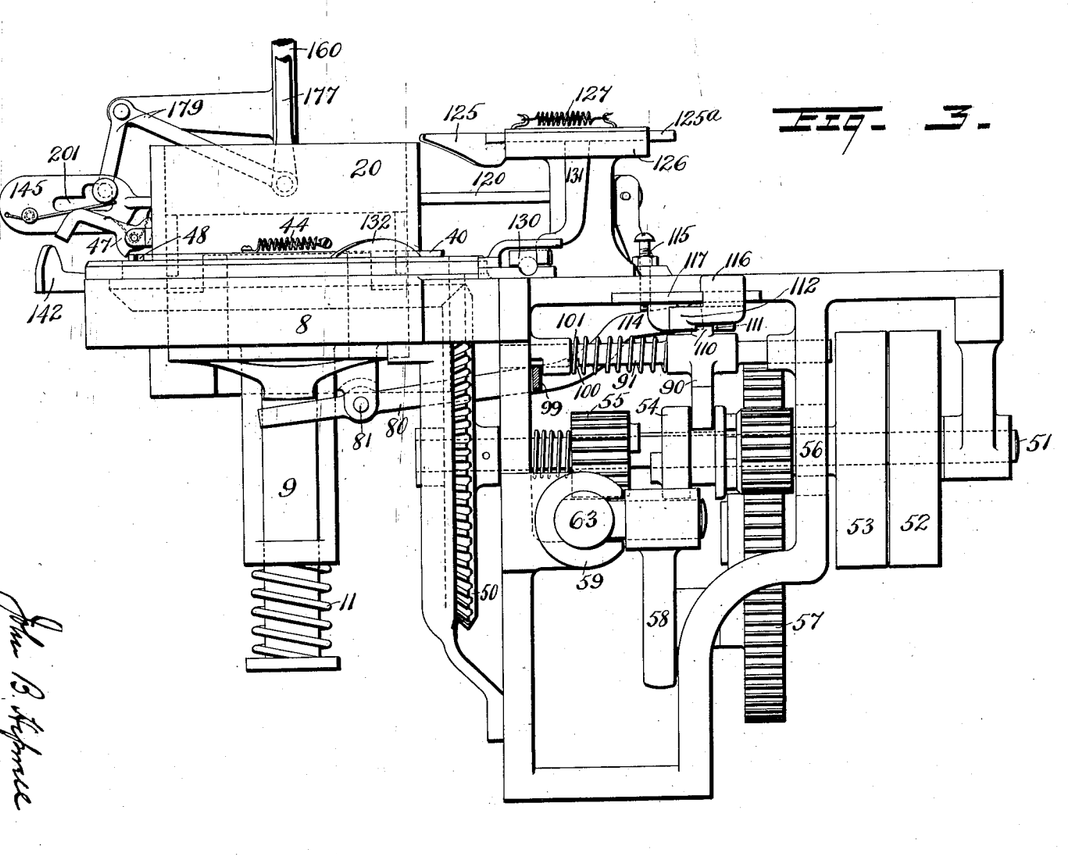
Fig. 3 is a partial front elevation looking in the direction of arrow 3, Fig. 1.

Changing the height of the needle-cylinder relative to the cam-cylinder during circular knitting enables the length of the stitches to be varied, so as to thereby fashion or shape the stocking as desired. The means provided for effecting this needle-cylinder movement in my improved machine shown comprises a lifting-lever 80, Figs. 3 and 1, fulcrumed to the machine-frame at 81, an intermediate lever 82, arranged at right angles thereto and having one end 83 thereof in adjustable contact with the free end of said lever 80, and a rock-shaft 84, having one arm 85 engaging the other end of said intermediate lever 82 and another arm 86, arranged in the path of suitable projections on the chain, whereby the required vertical positions of the needle-cylinder at different stages are automatically secured.

Figure 1:
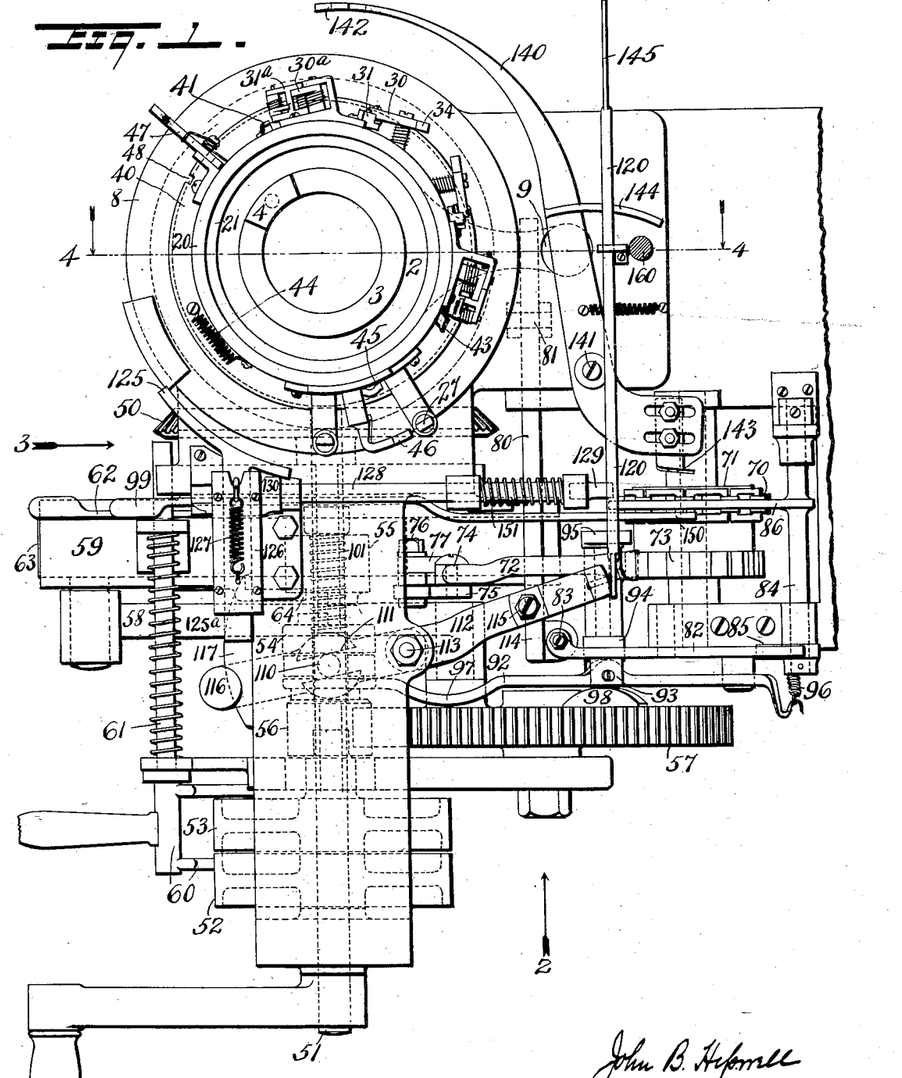
Figure 1 is a general plan view, the splicer mechanism being removed and its supporting-post indicated in cross-section.
Figure 2:
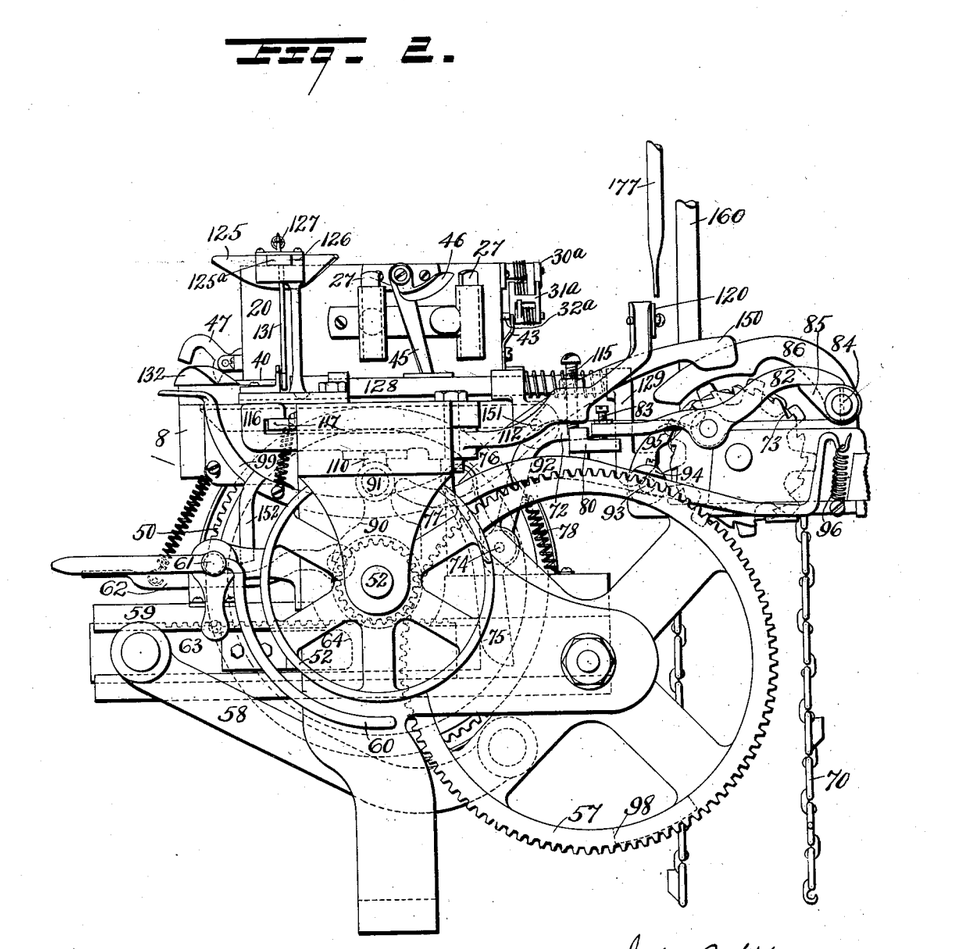
Fig. 2 is an end view corresponding with Fig. 1 looking in the direction of the arrow 2.

The movement of the clutch 54 on drive-shaft 51 to change from the rotary to the reciprocating action is effected, as shown, through a clutch-engaging arm 90, fixed to a suitably-mounted spring-pressed guiderod 91 by means of an operating-lever 92, Figs. 1 and 2, which is pivoted to the jaw-shaped end 93 of a suitably-mounted rock-shaft 94, having an arm 95 arranged in the path of a suitable projection on the pattern-chain. The latter thus serves merely to turn the rock-shaft 94, so as to lower the clutch-contacting end of the operating-lever 92 against the tension of a spring 96 sufficiently to bring the laterally-curved portion 97 of said lever into the path of a cam 98, fixed to the inner rim-face of the crank-wheel 57, the passing of said cam effecting the horizontal swinging movement of the lever 92 upon its pivotal connection to the rock-shaft 94, whereby the clutch is moved out of engagement with the drive-pulley pinion 56 and into engagement with the loose pinion 55. When this movement of the clutch has been made, it is retained in engagement with said loose pinion 55 by means of a spring-latch 99, which engages a notch 100, Fig. 3, in the clutch-rod 91 until said latch is released, as hereinafter described, to permit the reverse movement of the clutch by its spring 101 as required when the rotary movement of the cam-cylinder is to be resumed.

About the time when the clutch 54 is moved by the lever 92 to begin the narrowing operation as already described several other changes are made which will now be referred to in connection with a description of the mechanisms provided for effecting the same.

The clutch-engaging arm 90 91 is provided with a projecting pin 110, which engages the grooved or slotted portion 111 of a lever 112, which lever is fulcrumed intermediately at 113 and has its opposite end extending over the outer end 114 of the needle-cylinder-lifting lever 80. This outer end of the lever 80 has its upper surface inclined to the horizontal, Fig. 3, so that the swinging movement of the lever 112 close above it serves to depress said lever to raise the needle-cylinder, the extent of such raising action upon the needle-cylinder being regulated by an adjustable screw 115 in said lever 112, the lower end of the said screw being set so as to bear upon said inclined surface of the lifting-lever end 114 during the swinging movement of lever 112, and thus pressing it downward, as stated. To positively guide the lever in this swinging movement and insure its uniform action on the lifting-lever, its extended end 116 engages a guide-rib 117 on the machine-frame. This lever 112 operated by the clutch-engaging arm 90 is also utilized for a further purpose—namely, to operate a splicer mechanism so as to throw into service an extra thread, as is commonly done during the narrowing and widening operations to produce a reinforced heel and toe. For this purpose the lever 112 is extended beyond the needle-cylinder-lifting lever 80, which it operates as just described, and is connected at its end to a horizontal splicer-connecting rod 120, the construction and operation of which will be referred to hereinafter in describing the improved splicer mechanism and additional operating means provided therefor.

Preliminary to the narrowing operation the throw-out cam 23 must be moved inward to raise out of action at once half the needles, and the droppers must also be secured in inoperative position. These simultaneous movements, as well as the subsequent one of similarly throwing said needles back into action, as hereinafter described, are effected by means of a cam 125, slidably mounted in a guide-box 126, fixed to the machine-frame. (See Figs. 1, 2, and 3.) This cam 125 is normally held in retracted position by a spring 127, so as to be outside of the common path of the plunger-wedge 27 for the throw-out cam 23 and of the arm 46 of the slide-ring lever 40, all of which are carried by the rotary cam-cylinder 20, as already described, the cam 125, however, being adapted to operate both of said parts simultaneously when it is moved into their path. This is effected, as shown, by means of a slide-bar 128, operated by the pattern-chain, a suitable projection on which engages the silde-bar end 129, so as to reciprocate the slide-bar at right angles to the guide-box 126 and causes the inward movement of the latter by engagement of its forward wedge-shaped end 130 with a depending arm 131, Figs. 2 and 3, from the guide-shank 125ª of the cam, as indicated. The extent of this inward movement is such as to place the cam in the path of both the outer plunger-wedge 27 and the slide-ring lever 40, as already stated, and it may be here explained that the plunger-wedge 27 for the throw-in cam 24 is rotated in a path nearer the center of rotation of the cam-cylinder, so as not to be affected by the described adjustment of the cam 125, but that at a later period of the knitting process (namely, after the narrowing and widening steps are about completed) the cam 125 is employed to similarly operate this throw-in cam, the cam 125 being at such time moved forward farther than in the case just described by a larger projection on the pattern-chain, so as to be projected into the smaller diameter path of the throw-in plunger-wedge 27 and serving to depress said plunger just prior to the changing of the reciprocating movement to rotary.

The throw-out cam 23 is promptly withdrawn after its work has been done by means of a cam or projection 132, fixed in the path of rotation of its depressed plunger-wedge 27, so as to reraise the latter. The slide-ring 40, however, after being moved by the action of cam 125 on the slide-ring lever 45 is retained by the catch 47 in the position to which it is thus moved during the narrowing operation. Preliminary to the succeeding widening operation, however, it is necessary to release the catch 47 from the slide-ring 40, so that the movement of the latter by its spring 44 will permit the drop-pickers to resume their operative position. This releasing operation is effected by means of a cam-lever 140, (see Fig. 1,) pivoted at 141 and having its cam end 142 adapted to be swung into the path of the slide-ring catch 47 by the action at proper time of a passing projection on the pattern-chain upon the opposite end 143 of the lever. The drop-pickers being thus thrown into action, the widening operation proceeds as usual. Further reference to the cam-lever 140, however, is required because of the additional function given it by the provision of a second cam 144, Figs. 1 and 10, thereon, whereby the slotted end 145 of the splicer connecting-rod 120 is raised by the same movement that effects the throwing into action of the drop-pickers to cause the partial drop of the splicer thread-trough 175 and separation of the two threads preparatory to cutting and clamping the reinforcing-thread at the end of the widening operation, as hereinafter particularly described.

When the successive narrowing and widening operations which form the heel of the stocking have been completed and the rotary knitting is to be resumed, a projection on the pattern-chain strikes the adjacent end 150 of the spring-latch 99 and turns the latter on its fulcrum 151 sufficiently to lower the opposite portion of said latch out of its locking engagement with the notched clutch-arm rod 91, thereby releasing the latter and causing the clutch 54 to be moved into engagement with the drive-pulley pinion 56, so as to change the cam-cylinder movement from reciprocating to rotary, as previously described. This movement of the clutch also swings the connected lever 112, as before stated, but in reverse direction, thereby relieving its downward pressure upon the inclined end 114 of the needle-cylinder-lifting lever 80 and permitting the lowering of the needle-cylinder to restore the normal length of stitches during the knitting of the tubular portion of the foot. Simultaneously at the end of the reciprocating movement the exterior sliding cam 125 is thrown inward its extreme movement toward the cam-cylinder by the pattern-chain, as previously described, to engage the plunger-wedge 27 of the throw-in cam, and thereby lower all the raised needles into action.

When the tubular portion of the foot is completed, the operations already described for automatically effecting the narrowing and widening at the heel are repeated in like manner to form the toe. After the latter operation, however, and the knitting of several additional rounds, as usual, provision is made for automatically stopping the machine by means of the lever 99, this being accomplished by imparting to the latter, through a larger projection on the pattern-chain, a greater rocking movement than that described as occurring at the end of the heel-forming operation and by providing an arm 152 (see Fig. 2) on said lever 99, adapted to come into contact with the spring-lifted latch 62, engaging the slotted belt-shifter rod 61, so as to disengage said latch, thereby causing the shifting of the belt to the loose pulley and stopping the machine.

I will now describe my improved thread-splicer mechanism as shown, certain features of which and their operating connections to the coöperating mechanisms already described have been previously referred to.

Figures 9, 10, 11, 12, 13, 14, 15, 16, 17, 18:
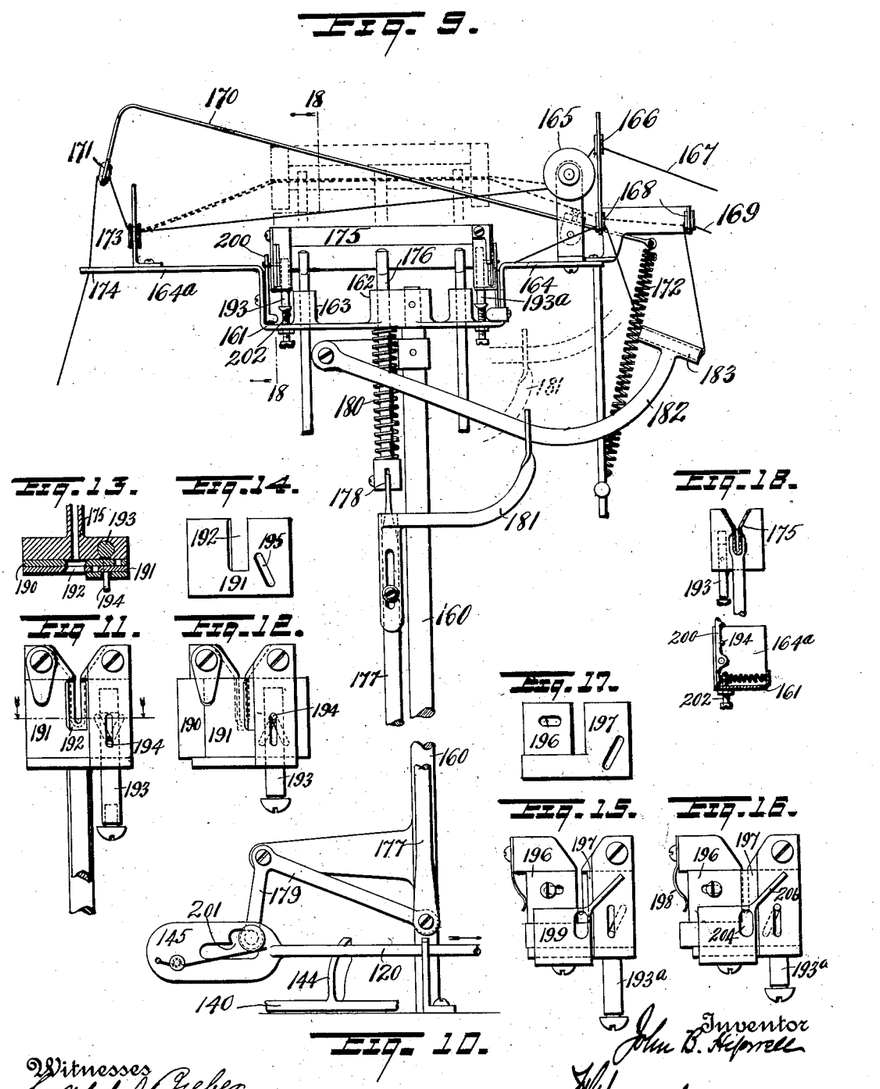

Fixed to the top of a supporting-post 160 on the machine-frame is a carrier-head 161, comprising a metal plate provided with guide-bosses 162 and 163 and opposite end extensions 164 and 164$^a$. Mounted upon the end extension 164 are the usual tension-disks 165 and guide-eye 166 for the approaching main thread 167 and spaced-apart guide-eyes 168 for the approaching reinforcing-thread 169, together with the pivoted take-up 170, having a terminal guide-eye 171 for the leaving thread or threads and its spring 172, while upon the opposite end extension 164$^a$ are provided fixed guide-eyes 173 and 174. Sliding in the central guide-boss 162 is a vertical rod 176, to the upper end of which is rigidly secured a splicer-trough 175, having parallel depending guide-bars sliding in the guide-bosses 163. The splicer-trough rod 176, as shown, has its lower portion 177 jointed at 178 to the upper portion to permit the slight lateral movement imparted to the lower portion by its connection to the bell-crank 179, by which the splicer-trough is elevated as required against a depressing-spring 180 on the rod 176. Adjustably fixed to the rod portion 177 is a finger 181, which engages a pivoted slack-arm 182, through the hollow end 183 of which the reinforcing-thread 169 is passed to raise said hollow end into alinement with the spaced-apart guide-eyes 168 when said thread is in service or lower the same to provide necessary slack in said thread preparatory to combining it with the main thread, as hereinafter described.

The splicer-trough 175, as shown, is formed with a narrow thread-receiving groove extending the full length thereof and is provided at its opposite ends with cutting means and clamping means, respectively, for the reinforcing-thread. The forward end of the trough is provided with the cutting means illustrated in Figs. 11 to 14 and comprising, as shown, two shearing-plates 190 and 191, arranged in a transverse guideway, so as to cut the thread, which normally passes freely through alined slots 192 in said plates when the latter are in central position, as indicated in Fig. 11. This opposite transverse movement is imparted to the plates by means of a vertically-guided operating-rod 193, which is provided with a forwardly-projecting pin 194, passing through oppositely-inclined slots 195 in the two plates, so that an upward movement of said rod 193 will cause a shearing action of the plates and its downward movement restore them to central position in the trough end. The thread-clamping means provided at the other end of the trough also comprises two transversely-guided plates 196 and 196, arranged in this case, however, in the same plane, and the operating-rod 193ᵃ engages and operates only the one plate 197, though the other is, as shown, slidable against a backing-spring 198 when the edges of the two plates are abutted to clamp the interposed thread. A thread-guide plate 199, having an eye 204 and an arm 206, is fixed to the incoming end of the splicer-trough. In the normal lowered position of the latter the main thread 167 passes above it to the outer guide-eyes 173, 171, and 174, while the forward portion of the reinforcing-thread 169 is loosely held in the trough-groove by the rear clamping-plates 196 197, with the slack-arm 182 in lowered position back of the trough to provide requisite slack thread for the thread splicing or combining operation, which is periodically effected by the raising of the splicer-trough to the position indicated in dotted lines, Fig. 9.

The means for raising and lowering the splicer-trough as required comprises the pivoted bell-crank 179, the horizontal splicer connecting-rod 120 with its slotted end 145 engaging one arm of said bell-crank, and the cam 144 for varying said engagement, all of which parts have been heretofore mentioned. Simultaneously with the beginning of each narrowing operation the movement of the connecting-rod 120 in the direction indicated by the arrow raises the splicer-trough to the dotted position, the slack-arm 182 rising with it and the shearing-plates 190 191 and clamping-plates 196 197 being spread by the downward movement of the rods 193 193ᵃ. This latter movement, as shown, is effected positively by means of spring-pressed hooks 200, pivoted to the fixed head 161, and which engage the projecting ends of the pins 194 to hold down the rods 193 and 193ᵃ during a portion of the trough-raising movement. When the trough is fully raised, as indicated in dotted lines, the loose end of the reinforcing thread is practically engaged with the moving main thread, so as to be carried along with the latter, as indicated by the close parallel dotted lines, during the heel or toe knitting. Before this double-thread knitting is completed the cam 144 is moved, as already described, so as to raise the slotted connecting-rod end 145 sufficiently to permit the connected end of the bell-crank 179 to enter the narrower portion of the slot 201, and thus allow the bell-crank to turn in the extended lower portion of said slot, so as to partially lower the splicer-trough 175 and permit the separation of the two threads preparatory to the cutting of the reinforcing-thread at the end of the heel or toe knitting. This cutting action and the simultaneous clamping of the reinforcing-thread are effected at the proper time by the final lowering of the splicer-trough through the reverse movement of the connecting-rod 120, effected by the lever 112, as previously described, the rods 193 and 193ᵃ being raised to operate the cutting and clamping plates by contact with adjustable stops 202 on the carrier-head 161 of the post 160 during such final lowering of the splicer-trough. The slack-arm 182 is of course lowered with the splicer-trough, so that the parts are ready for a repetition of the splicing operation, as determined by the pattern-chain and connecting mechanisms described.

The successive movements and operations of the various parts of my improved machine have been fully described substantially in the order of their occurrence in connection with the foregoing description of the particular construction and relative arrangement of said parts. The general process of knitting stockings carried into effect thereby is common and well known, my invention consisting in the novel mechanisms provided and in their coöperative arrangement, whereby the various movements and changes of operation required are effected at proper times in an improved manner and with comparative simplicity of construction and certainty of satisfactory operation.

In following the several movements effected or controlled by the pattern-chain it will be noticed—

First. That the raising and lowering of the needle-cylinder to vary the length of the stitches is effected by direct action of the chain upon the needle-cylinder-carrying lever 80, whereas the desired movement of the needle-cylinder preparatory to knitting the heel and toe is effected by each swing of the clutch-operated lever 112, the action of which upon the carrying-lever 80 may be conveniently regulated by the adjusting-screw 115.

Second. The slide-cam 125 is moved by the pattern-chain through the slide-rod 128, first, before starting the reciprocating movement a sufficient distance only to simultaneously operate the throw-out cam 23 and the slide-ring lever 45, and, second, when the reciprocating movement is about to be changed a greater distance to operate the throw-in cam 24.

Third. The movement of the clutch 54 to cause reciprocating motion of the cam-cylinder is merely controlled by the shifting action of the pattern-chain upon the clutch-operating lever 92, pivoted to the rock-shaft 94, the actual movement of said lever to throw the clutch being subsequently effected by the cam 98 on the crank-wheel 57, which cam operates upon said lever only when the latter is thus shifted into its path and is so timed as to first permit about two revolutions of the cam-cylinder after the throw-out cam has been thrown into action. Through the lever 112 this clutch movement also operates the splicer mechanism.

Fourth. The widening-lever 140 is operated by the pattern-chain at a time midway between the first and second movements of the slide-cam 125, and its cam portion 144 coöperates with the lever 112 in operating the splicer mechanism.

Fifth. The latch-lever 99 is operated in two ways—first, to merely release the clutch 54 for resuming the rotary movement, and, second, by a more extended movement, to also shift the belt for stopping the machine.

Thus it will be seen that by my improved mechanisms and their coöperative arrangement as described all the changes required to effect the various successive steps in the knitting of a stocking are positively and automatically made in a very simple and satisfactory manner and with great simplification of the machine.

The detail construction of parts and the particular arrangement thereof specifically set forth in the drawings and foregoing description may obviously be modified without departing from the invention.

What I claim is—

1. In a knitting-machine the combination with a cam-cylinder, a vertically-movable needle-cylinder, a change-motion for said cam-cylinder comprising a clutch, and a pattern mechanism arranged to control the operation of said clutch, of a lifting-lever for said needle-cylinder, and a clutch-operated lever and separate pattern-operated lever both arranged to directly engage the free end of said lifting-lever and to independently operate the latter substantially as set forth.

2. In a knitting-machine the combination with a cam-cylinder, a vertically-movable needle-cylinder, a change-motion for said cam-cylinder comprising a clutch, and a pattern mechanism arranged to control the operation of said clutch, of a lifting-lever for said needle-cylinder having its free outer end inclined to the horizontal, and a clutch-operated lever arranged to swing in a horizontal plane and to operate said lifting-lever so as to raise and hold elevated the needle-cylinder substantially as set forth.

3. In a knitting-machine the combination with a cam-cylinder, a vertically-movable needle-cylinder, a change-motion for said cam-cylinder comprising a clutch, and a pattern mechanism arranged to control the operation of said clutch, of a lifting-lever for said needle-cylinder having its free outer end inclined to the horizontal, a clutch-operated lever arranged to swing in a horizontal plane and to operate said lifting-lever so as to raise and hold elevated the needle-cylinder, and a separate pattern-operated lever arranged to swing in a vertical plane and to independently engage and operate said lifting-lever, substantially as set forth.

4. In a knitting-machine the combination with a cam-cylinder, a vertically-movable needle-cylinder, a change-motion for said cam-cylinder comprising a clutch, and a pattern mechanism arranged to control the operation of said clutch, of a lifting-lever for said needle-cylinder having its free outer end inclined to the horizontal, a clutch-operated lever arranged to swing in a horizontal plane and to operate said lifting-lever so as to raise and hold elevated the needle-cylinder, a separate pattern-operated lever arranged to swing in a vertical plane and to independently engage and operate said lifting-lever, and separate contact-screws in said clutch-operated lever and pattern-operated lever for independently regulating their separate lifting actions, substantially as set forth.

5. In a knitting-machine the combination with a cam-cylinder carrying a throw-out cam, a throw-in cam, and independent vertically-movable devices for operating said cams located at different distances from the cam-cylinder, of a cam movable in a fixed guide into the path of one or other of said devices.

6. In a knitting-machine the combination with a cam-cylinder carrying a throw-out cam, a throw-in cam, and independent vertically-movable devices for operating said cams located at different distances from the cam-cylinder, of a cam movable in a fixed guide and means for periodically moving said cam successively into the separate paths of said devices.

7. In a knitting-machine the combination with a cam-cylinder carrying a throw-out cam, a throw-in cam, and independent vertically-movable devices for operating said cams located at different distances from the cam-cylinder, of a cam movable in a fixed guide into the path of one or other of said devices to depress the same, and fixed means for reraising said devices.

8. In a knitting-machine the combination with a cam-cylinder carrying a throw-out cam and a throw-in cam, of a fitting thereto provided with horizontal and vertical guideways, a spring-retracted cam radially movable in said horizontal guideway, and a vertical plunger-wedge for projecting said cam to control the operation of the cylinder-cams.

9. In a knitting-machine the combination with a cam-cylinder carrying a throw-out cam and a throw-in cam with independent operating devices therefor, drop-pickers with a controlling slide-ring therefor, and an operating-lever for said ring, of a cam arranged to operate one of said independent devices and said ring-operating lever simultaneously at one period of the knitting operation, and the other device at a different period thereof, substantially as set forth.

10. In a knitting-machine the combination with a cam-cylinder carrying a throw-out cam and a throw-in cam with independent operating devices therefor, drop-pickers with a controlling slide-ring therefor, and an operating-lever and latch-lever for said ring, of a cam arranged to operate said devices and said slide-ring-operating lever, and separate means for operating said latch-lever, substantially as set forth.

11. In a knitting-machine the combination with a cam-cylinder carrying drop-pickers, a slide-ring, fingers engaging said pickers, a ring-operating lever and spring, and a ring-locking latch, of separate cams adapted to engage said ring-operating lever and said ring-locking latch respectively and a pattern mechanism for periodically operating said separate cams as required, substantially as set forth.

12. In a knitting-machine the combination with a change-motion mechanism comprising a crank-wheel and a rack-bar reciprocated thereby, of a pattern-chain mechanism comprising an operating-pawl therefor, a pivoted carrying-lever for said pawl having its free end arranged in the path of a contacting portion of said reciprocating bar, and a spring arranged to normally retract said pawl and carrying-lever, substantially as set forth.

13. In a knitting-machine the combination with a change-motion mechanism comprising a clutch and a geared wheel having a cam projection, of a shiftable clutch-throwing lever adapted to be operated by said cam, and pattern-controlled means for shifting said lever into the path of said cam, substantially as set forth.

14. In a knitting-machine the combination with a change-motion mechanism comprising a clutch and a geared wheel having a cam projection, of a clutch-throwing lever, a rock-arm to which said lever is pivoted, and a pattern mechanism and spring arranged to jointly control the position of said lever relative to the cam, substantially as set forth.

15. In a knitting-machine the combination with a change-motion mechanism comprising a clutch and a suitably-guided spring-pressed clutch-arm rod, of means for positively moving said clutch-arm rod, a latch for locking the latter, and a pattern mechanism for releasing said latch, substantially as set forth.

16. In a knitting-machine the combination with a change-motion mechanism comprising a clutch and a suitably-guided spring-pressed clutch-arm rod, and a stop-motion comprising a suitably-guided spring-pressed belt-shifting device, of separate latches for said clutch-arm rod and shifting device one of which latches engages the other to release the latter, substantially as set forth.

17. In a knitting-machine the combination with a change-motion mechanism comprising a clutch and a suitably-guided spring-pressed clutch-arm rod, and a stop-motion comprising a suitably-guided spring-pressed belt-shifting device, of separate latches for said clutch-arm rod and shifting device and a pattern mechanism arranged to operate said clutch-arm latch to release one or both of said latches as desired.

18. In a knitting-machine the combination with a change-motion mechanism comprising a clutch, and with an adjustable needle-cylinder and raising and lowering lever therefor, of a splicer mechanism comprising a vertically-guided splicer-rod, and a clutch-operated lever arranged in operative engagement with said raising and lowering lever and also with said splicer-rod.

19. In a knitting-machine the combination with a change-motion mechanism comprising a clutch, of a thread-splicer mechanism comprising a vertically-guided splicer-rod, a bell-crank having one arm thereof connected to said splicer-rod, a connecting-rod having an end provided with a shouldered slot adjustably engaging the other arm of said bell-crank, a spring and a cam mechanism for controlling said engagement, and a clutch-operated lever operatively connected to said connecting-rod.

20. In a knitting-machine the combination with a change-motion mechanism comprising a clutch, of a thread-splicer mechanism comprising a vertically-guided splicer-rod, a bell-crank having one arm thereof connected to said splicer-rod, a connecting-rod having one end provided with a slot of unequal width forming a shoulder and engaging the other arm of said bell-crank, a clutch-operated lever operatively connected to said connected rod, and means for raising and lowering the slotted end of said connecting-rod to vary its connection to the bell-crank.

21. In a knitting-machine the combination with a change-motion mechanism comprising a clutch, and a cam-lever for releasing the drop-pickers, of a splicer mechanism comprising a vertically-guided splicer-rod, a bell-crank having one arm thereof connected to said splicer-rod, a connecting-rod having one end provided with a slot of unequal width forming a shoulder and engaging the other arm of said bell-crank, and a clutch-operated lever operatively connected to said connecting-rod, said drop-picker cam-lever being also adapted to raise and lower the slotted end of said connecting-rod to vary its connection to the bell-crank.

22. In a knitting-machine, a thread-splicing mechanism comprising a carrier-head provided with thread-guides for an upper main thread and a lower reinforcing-thread and a vertically-movable splicer-trough, and mechanism for raising said trough fully to engage the threads and thereafter lowering the same by steps substantially as set forth.

23. In a knitting-machine, a thread-splicing mechanism comprising a carrier-head provided with thread-guides for an upper main thread and a lower reinforcing-thread and a vertically-movable splicer-trough carrying cutting means and clamping means, and mechanism for raising said trough fully to engage the threads and thereafter lowering the same first partially to disengage the threads and then fully to operate said cutting and clamping means.

24. In a thread-splicing mechanism for knitting-machines, a vertically-movable splicer-trough provided at its opposite ends respectively with transversely-movable cutting and clamping devices, and vertically-movable rods engaging said devices to reciprocate the same substantially as set forth.

25. In a thread-splicing mechanism for knitting-machines, the combination with a carrier-head, of a vertically-movable splicer-trough guided therein, transversely-movable cutting and clamping devices and vertically-movable operating-rods therefor carried by said trough, and adjustable seats on the carrier-head for said rods.

26. In a thread-splicing mechanism for knitting-machines the combination with a fixed carrier provided with reinforcing-thread guides, of a movable splicer-trough carrying thread cutting and clamping devices, a slack-arm pivoted to said fixed carrier, and a splicer-trough rod having a finger engaging said slack-arm, substantially as set forth.

In testimony whereof I affix my signature in the presence of two witnesses.

JOHN B. HIPWELL.

Witnesses:
D. M. STEWART,
W. G. STEWART.